United States Patent
Liu et al.

(10) Patent No.: US 10,572,383 B2
(45) Date of Patent: Feb. 25, 2020

(54) CACHING A BLOCK OF DATA IN A MULTI-TENANT CACHE STORAGE DEVICE BASED ON SPACE USAGE BOUNDARY ESTIMATES

(71) Applicant: International Business Machines Corporation, Armonk, NY (US)

(72) Inventors: Yan Zhao Liu, Xian (CN); Yue Liu, Xian (CN); Fei Qi, Xian (CN); Wei Wu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 15/485,347

(22) Filed: Apr. 12, 2017

(65) Prior Publication Data

US 2018/0300242 A1 Oct. 18, 2018

(51) Int. Cl.
*G06F 12/0806* (2016.01)

(52) U.S. Cl.
CPC .... *G06F 12/0806* (2013.01); *G06F 2212/608* (2013.01)

(58) Field of Classification Search
CPC ........ G06F 12/0842; G06F 3/06; G06F 16/00; G06F 9/50; G06F 11/34
See application file for complete search history.

(56) References Cited

U.S. PATENT DOCUMENTS

| 9,298,616 | B2 | 3/2016 | Soundararajan et al. |
| 9,330,055 | B2 | 5/2016 | Butt et al. |
| 9,430,277 | B2 | 8/2016 | Zaroo et al. |
| 2005/0071599 | A1 | 3/2005 | Modha et al. |
| 2016/0034394 | A1* | 2/2016 | McKean ............. G06F 12/0806 709/217 |
| 2016/0170882 | A1 | 6/2016 | Choi et al. |

(Continued)

FOREIGN PATENT DOCUMENTS

CN 103631730 B 4/2016

OTHER PUBLICATIONS

Kunjir, Mayuresh et al., "ROBUS: Fair Cache Allocation for Multi-tenant Data-parallel Workloads", Duke University, Sep. 3, 2015, 18 pages. (Year: 2015).*

(Continued)

*Primary Examiner* — Ramon A. Mercado
(74) *Attorney, Agent, or Firm* — Stephen J. Walder, Jr.; Robert M. Sullivan (57) ABSTRACT

Mechanisms are provided for managing caching of data in a multi-tenant cache storage device utilized by a distributed dataset based application. The mechanisms retrieve Resilient Distributed Dataset (RDD) block size information for an RDD associated with an application. A probability distribution of RDD block sizes is generated based on the RDD block size information and a maximum size for a RDD block of data is estimated based on the probability distribution. An amount of free space in a portion of the multi-tenant cache storage device allocated to the application is estimated based on the estimated maximum size for the RDD block of data. Cache operations for caching data associated with the application to the multi-tenant cache storage device are managed based on the estimated amount of free space in the portion of the multi-tenant cache storage device allocated to the application.

18 Claims, 5 Drawing Sheets

(56) References Cited

U.S. PATENT DOCUMENTS

2018/0067869 A1* 3/2018 Yang .................... G06F 16/188
2018/0300242 A1* 10/2018 Liu .................... G06F 12/0806

OTHER PUBLICATIONS

Kunjir, Mayuresh et al., "ROBUS: Fair Cache Allocation for Multi-tenant Data-parallel Workloads", Duke University, Sep. 3, 2015, 18 pages.

Xu, Luna et al., "MemTune: Dynamic Memory Management for In-memory Data Analytic Platforms", 2016 IEEE International Parallel and Distributed Processing Symposium (IPDPS), May 2016, 10 pages.

* cited by examiner

| RDD KEY (RDD ID) 410 | MIN BLOCK SIZE 420 | MAX BLOCK SIZE 430 | BLOCK RECORD SIZES 440 |
|---|---|---|---|
| 1 | 50M | 90M | [52M, 88M, 90M, 60M, 60M, 70M,....] |
| 2 | 100M | 210M | [120M, 100M, 185M, 210M,....] |
| 3 | 30M | 70M | [31M, 30M, 35M, 40M, 70M, 36M,....] |
| ... | ... | ... | ... |

CACHING A BLOCK OF DATA IN A MULTI-TENANT CACHE STORAGE DEVICE BASED ON SPACE USAGE BOUNDARY ESTIMATES

BACKGROUND

The present application relates generally to an improved data processing apparatus and method and more specifically to mechanisms for caching a block of data in a multi-tenant cache storage device based on space usage boundary estimates.

The volume of data to be processed in the field of "Big Data" is growing at an unprecedented rate at the same time that analysis is becoming more computation intensive. In order to support emerging distributed processing applications, extreme-scale memory and increased computational power are required. The complexity and computation needs of such applications lead to performance bottlenecks in conventional architectures.

To address these limitations, technologies have been developed to improve the speed by which distributed data processing may be performed. One such technology is Apache Spark. Apache Spark is a fast, in-memory data processing engine which provides Application Programming Interfaces (APIs) that allow data workers to efficiently execute streaming, machine learning, or Structured Query Language (SQL) workloads that require fast iterative access to datasets. Apache Spark may be run on Apache Hadoop YARN and is designed for making data science and machine learning easier to implement. Apache Spark consists of a Spark Core and a set of libraries, where the Apache Spark Core is a distribute execution engine offering a platform for distributed ETL application development.

A fundamental data structure of Apache Spark is the Resilient Distributed Datasets (RDD). Spark makes use of the concept of RDD to achieve faster and efficient MapReduce operations. A Resilient Distributed Dataset (RDD) is a resilient and distributed collection of records spread over one or more partitions. Each dataset in RDD is divided into logical partitions, which may be computed on different nodes of the cluster. Formally, an RDD is a read-only, partitioned collection of records. RDDs can be created through deterministic operations on either data on stable storage or other RDDs. RDD is a fault-tolerant collection of elements that can be operated on in parallel. There are two ways to create RDDs, i.e. parallelizing an existing collection or referencing a dataset in an external storage system, such as a shared file system, Hadoop Distributed File System (HDFS), Apache HBase, or any data source offering a Hadoop Input Format.

RDD allows programmers to perform in-memory computations on large clusters in a fault-tolerant manner. RDD is resilient in that it is fault-tolerant with the assistance of RDD lineage graphs and so is able to re-compute missing or damaged partitions due to node failures. RDD is distributed with data residing on multiple nodes in a cluster and is a dataset because it comprises a collection of partitioned data with primitive values or values of values, e.g., tuples or other objects that represent records of the data. In addition to the above characteristics, RDD also has the following characteristics, among others:

(1) data inside a RDD is stored in memory as much and as long as possible;
(2) the data inside RDD is immutable in that it does not change once created and can only be transformed using RDD transformations;
(3) all of the data inside RDD is cacheable in a persistent memory or disk storage;
(4) allows for parallel processing of the data based on RDD partitioning;
(5) data, or records, inside the RDD are partitioned into logical partitions and distributed across nodes in a cluster, where the location of partitions may be used to define Apache Spark's task placement preferences.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a plurality of processing nodes and a multi-tenant cache storage device for caching a blocks of data of one or more Resilient Distributed Datasets (RDDs) associated with an application. The method comprises retrieving, by a multi-tenant cache management engine of the data processing system, RDD block size information for an RDD associated with the application. The method also comprises generating, by the multi-tenant cache management engine, a probability distribution of RDD block sizes based on the RDD block size information. In addition, the method comprises estimating, by the multi-tenant cache management engine, a maximum size for a RDD block of data based on the probability distribution and estimating, by the multi-tenant cache management engine, an amount of free space in a portion of the multi-tenant cache storage device allocated to the application based on the estimated maximum size for the RDD block of data. Moreover, the method comprises managing, by the multi-tenant cache management engine, cache operations for caching data associated with the application to the multi-tenant cache storage device based on the estimated amount of free space in the portion of the multi-tenant cache storage device allocated to the application.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for improving the operation of cache memories and data storage in such cache memories utilized for distributed datasets operated on by distributed data processing applications, such as Apache Spark and the like. In particular, the illustrative embodiments provide mechanisms for caching a block of data in a multi-tenant shared memory based on space usage boundary estimates. The illustrative embodiments provide a solution to the problem of caching partition data (or blocks) of logical partitions of a dataset, such as a Resilient Distribute Dataset (RDD) in Apache Spark, where there are multiple concurrently executing threads that are caching the partition data and each thread is not aware of the records and the sizes of such records that are being written by the other threads to the cache storage device, e.g., a cache memory or disk, allocated for the application. In such a situation, it is not known what the block size is until the block data is successfully cached, i.e. the block size for a block of data of an RDD may be different from other blocks of data in the RDD. Moreover, because the logical partitions of the dataset are generated by the particular partitioning algorithm utilized, the size of the block data for the logical partitions may be different for each logical partition. This leads to a problem of caching data in such a way as to not exceed the amount of memory space allocated to the particular application, i.e. determining whether a particular partition's block of data should be cached in the cache memory, e.g., a solid state drive (SSD) storage or other cache memory, or not based on whether it is likely that the caching of the partition data will exceed the application's allocated memory space.

The illustrative embodiments provide mechanisms for estimating space usage boundaries for multiple threads that are caching blocks of data in a multi-tenant shared storage space configured to store Resilient Distributed Dataset (RDD) blocks. The illustrative embodiments utilize a simulation model to estimate the possible size of a RDD block of data (also referred to herein simply as a "block"). This estimate is used to prevent storage of data beyond the applications' specified storage space allocation. The simulation model operates on a probability distribution of RDD block record sizes, and information about the minimum and maximum block size for the RDD, to estimate a maximum block size with a predetermined level of probability, e.g., 90% in the examples herein, but may be set to any desired probability based on the implementation. This estimate may then be used to estimate the free space available to the allocated portion of the cache for the application should the block be stored to the cache memory. If this estimate of free space is less than a predetermined threshold amount of free space, e.g., 0 in the examples herein, but may be set to any desired value based on the implementation, then the caching of the block of data may be inhibited.

Thus, through simulation and estimation of the maximum block size that is likely to be stored to the cache memory by the various threads associated with the RDD, a determination may be made as to whether or not to allow a thread to cache its corresponding data block to the cache memory. In this way, the instances where threads stored blocks to the cache memory and exceed the application's allocated cache memory space are minimized.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
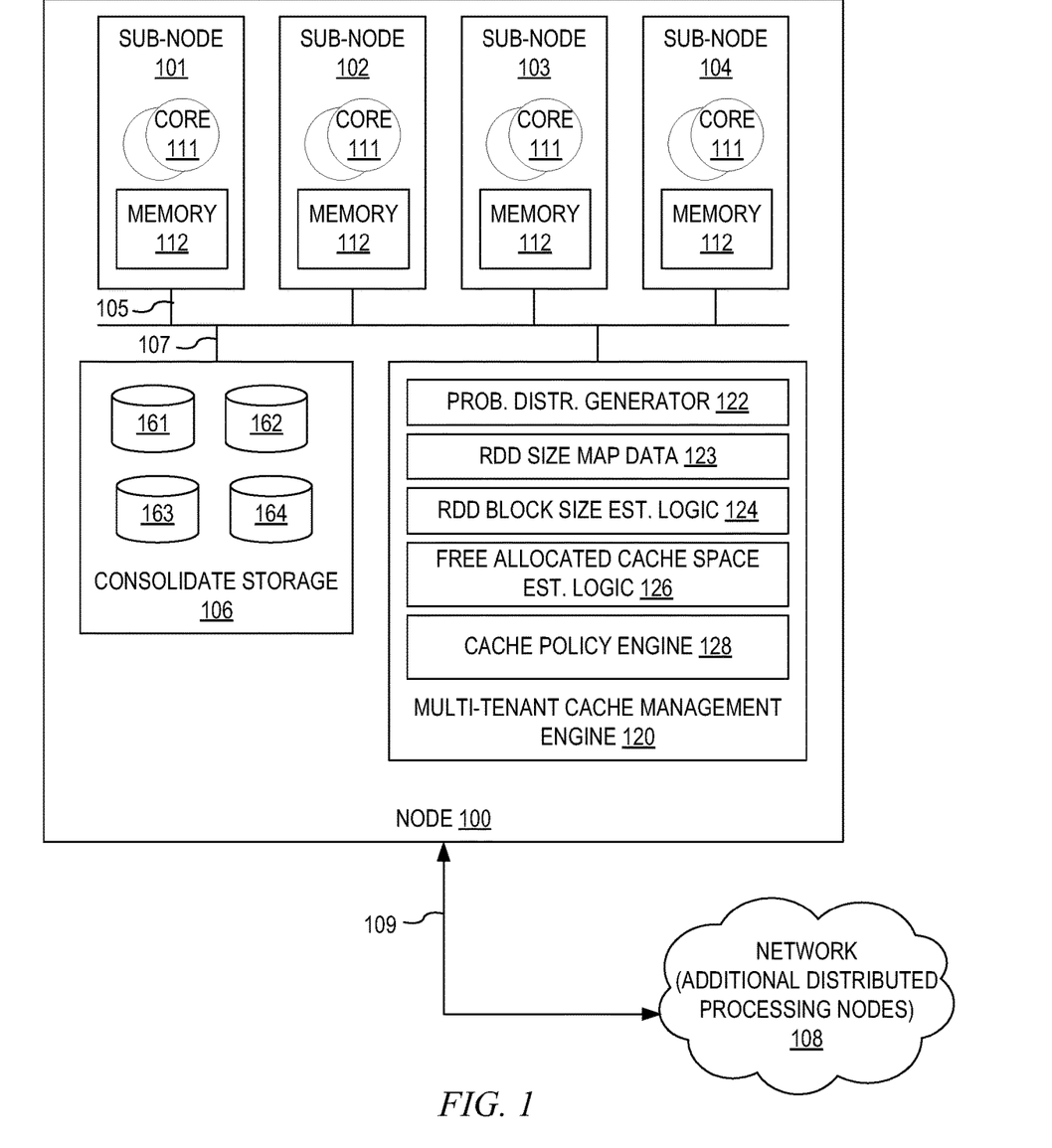
FIG. 1 is an example schematic representation of a distributed processing node according to one illustrative embodiment.
Figure 2:
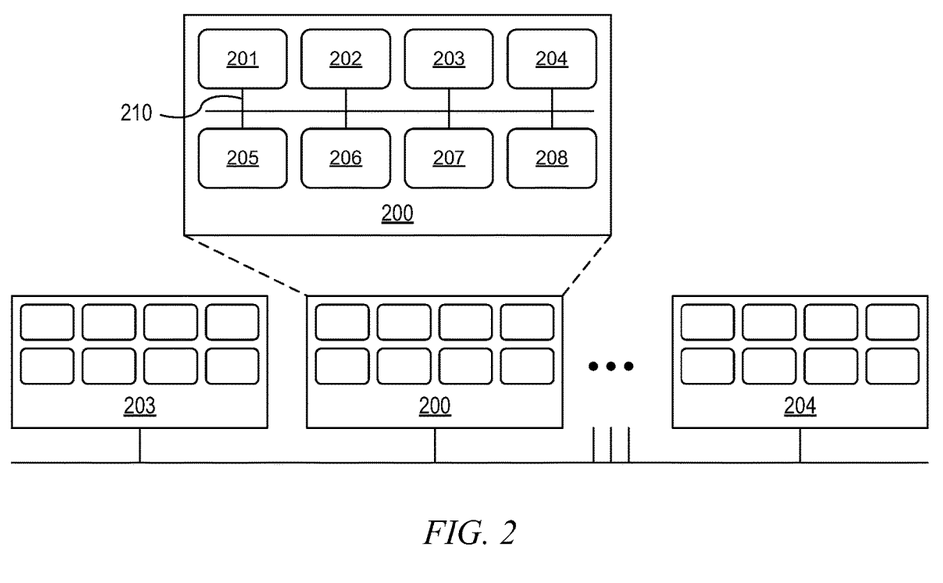
FIG. 2 is an example schematic representation of a distributed processing cluster according to one illustrative embodiment.
Figure 3:
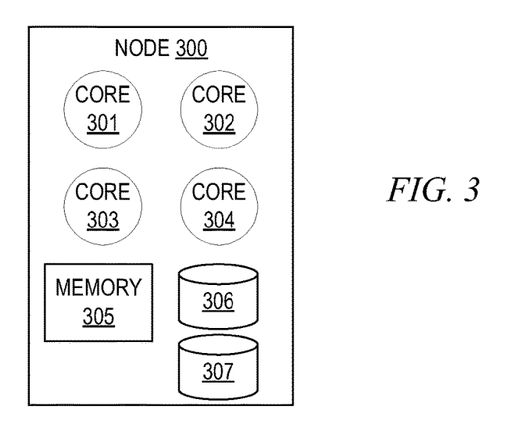
FIG. 3 is an example schematic representation of a distributed processing node according to another illustrative embodiment.

Thus, the illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to FIG. 1, a distributed processing node according to one illustrative embodiment is illustrated. Node 100 may be a rack, a blade enclosure, or another computing platform supporting multiple processing sub-units. Within node 100 are sub-nodes 101, 102, 103, 104. In some embodiments, sub-nodes 101, 102, 103, 104 comprise blades within a blade enclosure. In some embodiments, the number of sub-nodes within a node may be lower or higher according to the processing needs of a given application. In some embodiments, sub-nodes are dynamically added or removed from the node to accommodate fluctuating demand. Each sub-node comprises at least one processor core 111 and a memory 112. In some embodiments, the processor cores are spread over several discrete processors, while in some embodiments, all cores in a given sub-node are within a single multi-core processor. Processors with from one to over a hundred cores are known in the art. In some embodiments, a sub-node has between 6 and 12 cores. In some embodiments, each sub-node may have from 1 GB to over 24 GB of memory. In some embodiments, a portion of each memory is used for I/O buffering. In other embodiments, solid-state drives (SSDs) are used instead of or in addition to memory for I/O buffering.

Each sub-node is connected to each other sub-node by an interconnect 105. Each sub-node is connected to consolidated storage 106 by an interconnect 107. Consolidated storage 106 may contain any number of physical storage devices 161, 162, 163, 164. Storage devices 161, 162, 163, 164 may be any physical storage device known in the art, including both magnetic and optical media. In some embodiments, storage devices 161, 162, 163, 164 are hard disk drives (HDDs). In some embodiments, consolidated storage 106 uses RAID or another storage virtualization scheme. The number of storage devices may be varied based on cost and capacity requirements. The addition of spindles to consolidated storage 106 provides higher throughput, and allows consolidation of typically bursty workload from different sub-nodes. Node 100 may be connected to additional distributed processing nodes 108 to form a distributed processing cluster via interconnect 109.

In some embodiments, the distributed processing node 100 is a node in a MapReduce-based distributed processing system such as Apache Hadoop. A MapReduce system allocates work across a plurality of processing nodes in a cluster through a Map step. The results from each of the distributed processing nodes are combined in a Reduce step. In Apache Hadoop, jobs are allocated between nodes by a JobTracker, based in part on the location of data required by that job. In some implementations, a job is preferentially assigned to a node with the requisite data, and failing that, is assigned to a node in the same rack as the requisite data. A MapReduce-based system may include a distributed filesystem such as the Hadoop Distributed File System (HDFS). HDFS distributes data across multiple nodes in the distributed processing cluster, providing for data reliability by ensuring duplication on several nodes in several locations. HDFS nodes communicate with each other in order to rebalance data between nodes, move duplicates, and ensure high availability. By determining the location of requisite data in HDFS, a work scheduler, such as the Hadoop JobTracker, may allocate work to a node that has local access to that data.

Within the node architecture of FIG. 1, the hardware configuration may be tuned for various application types. For I/O intensive applications, a low computation power to memory ratio on a sub-node and a high-speed network interconnect between sub-nodes is desirable. For computation intensive applications, a high computation power to memory ratio and a standard network interconnect between sub-nodes is desirable. For mixed applications, a mix of differently configured sub-nodes is desirable. When a mix of sub-node configurations are available, work may be preferentially scheduled to those nodes most appropriate to the nature of the work. In addition, a large memory coupled with a prefetch cache is desirable in mixed applications in order to absorb I/O bursts.

The number of sub-nodes per node may also be tuned for a given application. For example, a configuration in which there are more sub-nodes per node is optimized for larger jobs. A configuration in which there are fewer sub-nodes per node is optimized for smaller jobs. Resource fragmentation may occur as the number of sub-nodes per node rises. In particular, if more sub-nodes are added per node, some may remain idle if a job does not need the available resources. Resource fragmentation may be minimized by employing node-level multi-tenancy.

FIG. 2 shows an exemplary arrangement of a plurality of distributed processing nodes within a distributed processing cluster. The cluster contains one or more racks 200, 203, 204. Rack 200 contains one or more distributed processing nodes 201-208. Distributed processing node 208 may be a node such as node 100 as described with regard to FIG. 1 above, or a node such as described with regard to FIG. 3 below. Nodes within a rack are connected by interconnect 210. Multiple additional racks 203, 204, each having its own resident nodes, are connected by interconnect 202. Nodes within rack 200 and within other racks 203, 204 may be Hadoop nodes. In some embodiments, there is only one node 208 per rack 200. In such embodiments, interconnect 210 may be omitted, and nodes on multiple racks may be connected through interconnect 202. In some embodiments, nodes 201-208 are connected to a network switch in the rack 200, and multiple racks 200, 203, 204 form a tree hierarchy. In some embodiments, data is managed by running HDFS on all disks at the node level.

FIG. 3 shows an exemplary alternative node lacking the sub-node structure described above with regard to FIG. 1. Node 300 includes one or more processing cores 301, 302, 303, 304, a memory 305, and one or more physical storages 306, 307. As the demand on an individual distributed processing node 300 increases, memory per node, cores per node, and disks per node must be increased to provide additional capacity. In addition, the interconnect between the various nodes must be provisioned to accommodate larger data throughput. In particular, where node 300 is a Hadoop node or another distributed processing node utilizing the Hadoop Distributed File System (HDFS), the network must be provisioned to support I/O-intensive shuffle phases. Other distributed file systems have similar capacity requirements. Inter-rack and intra-rack networks have to be provisioned differently to accommodate different latency/bandwidth requirements at the different levels. In some embodiments, each node 300 in a distributed processing cluster has a similar amount of memory, number of processors and local disks.

Emerging computation and data intensive applications require a rapid increase in the resources needed at distributed processing nodes. The node architecture shown in FIG. 1 provides for more flexible expansion than the node architecture shown in FIG. 3. In particular, increased use of memory can create a bottleneck in distributed processing systems such as Hadoop. Allocating too much memory to a node such as that depicted in FIG. 3 also results in an undesirable cost per node. Node 100 of FIG. 3 overcomes these issues by leveraging recent increases in node-to-node bandwidth and internal network speeds.

Node 100 exploits fast-growing network bandwidth to create a distributed-blade server within a single distributed processing node (such as a Hadoop node). The fast interconnect 105 between sub-nodes 101, 102, 103, 104 may be used to create a large consolidated-memory pool across several sub-nodes, which can be accessed at almost-local-memory-access speeds by any one of the sub-nodes 101, 102, 103, 104 within a node 100. By allocating each sub-node 101, 102, 103, 104 to a blade or similar computing unit, node 100 is based on commodity hardware and avoids custom components. The result is reduced costs, increased maintainability, and increased flexibility.

By providing individual memory 112 within each modular sub-node 101, a better computation to memory ratio is provided than in monolithic multiple core systems. Interconnect 107 may be over-provisioned to support faster access to storage 106. Interconnect 105 may likewise be over-provisioned to support fast memory access between sub-nodes 101, 102, 103, 104. In particular, sub-nodes may support peer-to-peer memory interactions via interconnect 105. In some embodiments, interconnect 105 and 107 are branches of the same interconnect, such as a fiber network within a blade enclosure or rack.

The modular node architecture of FIG. 1 avoids the constraints imposed by limited capacity nodes such as that depicted in FIG. 3. In addition, when operating within a Hadoop cluster, node 100 allows distributed processing while leveraging standard MapReduce implementations for job scheduling and standard distributed filesystems such as HDFS.

With the above as an example computing environment in which aspects of the illustrative embodiments may be implemented, as noted above, the illustrative embodiments provide mechanisms directed to the problems associated with multi-tenant cache memories in computing environments in which there are multiple threads writing blocks of data (or simply "blocks") of their corresponding Resilient Distributed Datasets (RDDs) to cache memory without knowing the sizes of the blocks being written until after the data is cached in the cache memory. In such a situation, the allocated cache storage space may be exceeded for an application. The illustrative embodiments provide a simulation based predictive mechanism for determining whether a block of data should be written to the cache memory or not based on a probability that the size of the block will exceed the currently available cache memory allocated to the application.

For example, returning to FIG. 1, in accordance with some illustrative embodiments, the distributed processing node 100 may be specifically configured to implement a multi-tenant cache management engine 120 that comprises probability distribution generator 122, RDD block size estimation logic 124, free allocated cache space estimation logic 126, and cache policy engine 128. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of the distributed processing node 100, for causing one or more hardware processors of the distributed processing node 100 to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates more efficient cache usage in a multi-tenant cache system for distributed dataset based processing, such as in Apache Spark and the like.

It should be appreciated that in the present context, an application, e.g., an Apache Spark application in the examples herein, may have many RDDs and each RDD may have many blocks of data (which are also referred to as partitions). Each block of data may have multiple records, each block potentially having a different number of records. Thus, each block of an RDD may have a different size that is not known prior to the block being cached in the cache memory. There may be multiple threads that together store a block of data of the RDD to the cache memory and each thread does not know the size of the data being stored by the other threads. That is, there are multiple concurrently executing threads that cache the block/partition data and the size of the data that each thread caches is not known until after it is cached.

As shown in FIG. 1, the multi-tenant cache management engine 120 comprises probability distribution generator 122 which provides logic for generating a probability distribution for the programmer directed cached data, e.g., RDDs. The probability distribution generator 122 operates on a RDD size map data structure 123 that is populated with information regarding each of the RDDs, their minimum block size and maximum block size, and the block record sizes associated with the RDD. The RDD size map data structure 123 is generated based on cached RDD block record history information that is compiled over time when the system is first operating. That is, in the beginning of operation, the system will have enough free space to cache RDD blocks and corresponding history information is compiled as the cache memory begins to fill, i.e. as RDD blocks are successfully cached, the information about the cached RDD blocks is added to the RDD size map data structure 123.

The probability distribution generator 122 may iterate through each of the RDDs in the RDD size map data structure 123 based on RDD key to process each RDD's information to generate a corresponding estimated block size based on a probability distribution of the corresponding RDD's block record sizes and the minimum and maximum block size. The distribution of block record sizes is segmented into a plurality of regions based on a predetermined maximum region number, e.g., 10 regions in some illustrative embodiments. It should be appreciated that the number of regions may be set to any desirable value with more regions meaning that the probability distribution of the block size may be evaluated more precisely than with less regions.

The RDD block is partitioned into equally size regions based on the difference in the minimum and maximum region values, e.g., if the maximum block size for the RDD is 90 M and the minimum block size for the RDD is 50 M, and the maximum region value is 10, then the region size is (90−50)/10 or 4 M, such that region 1 comprises block records having sizes in the range of [50, 50+((90−50)/10)*1]; region 2 comprises block records having sizes in the range of [54, 50+((90−50)/10)*2]; region 3 comprises block records having sizes in the range of [58, 50+((90−50)/10)*3]; and region 10 region 2 comprises block records having sizes in the range of [60, 50+((90−50)/10)*10]. The probability values of the partitioned regions are then calculated as a function of the number of block records for the RDD and the block record sizes of the block records falling into each region, e.g., if a first region is from 50-54 M using the above example, and there are 10 block record size values stored in the RDD size map data structure 123 with only 1 block record size falling into the 50-54 M range, then the probability for region 1 is 10%.

For example, the following relationships may be used to calculate the probability for a particular region in the probability distribution:

1. regionSize=(MaxBlockSize−MinBlockSize)/regionNumber, where RegionSize is the size of a region (e.g., 4 M in the above example), MaxBlockSize is the maximum block size for the RDD, MinBlockSize is the minimum block size for the RDD, and regionNumber is a predetermined value indicating the number of regions in which to separate the probability distribution, e.g., 10 in the above example.

2. region$_i$=[MinBlockSize+(i−1)*regionSize, MinBlockSize+i*regionSize], where i is the region number having a value between 1 and the regionNumber and the two values in the brackets indicates the range of block record sizes corresponding to that region.

3. Prob$_1$=(Count(all BlockRecor[j]))/BlockRecord.size, where BlockRecor[j] are all of the records whose sizes fall within the region i, and j is a value ranging from 1 to the BlockRecord.size, where BlockRecord.size is the total number of RDD block records, i.e. the Prob$_1$ is the number of block records in the region i divided by the total number of block records.

The RDD block size estimation logic 124 of the multi-tenant cache management engine 120 provides logic for estimating the maximum size of the RDD's block based on the probability distribution and a simulation model. The possible maximum size of the RDD block is determined based on a computation of the minimum number of regions I (where I is the index of the regions), where the summation of probability values for regions I is equal to or greater than a predetermined probability, e.g., 90% in some illustrative embodiments. Thus, for example, the summation iterates over the regions from 1 to a number of regions I adding the probabilities of the next region to the previous sum of region probabilities until a predetermined probability value is reached or exceeded, but having a maximum number of regions equal to the region number value, e.g., 10 in the above example. In the example set forth above, when the summation of the probabilities of the regions equals or passes the 90% probability value in this example embodiment, the region identifier I indicates the minimum number of regions needed to reach or exceed the predetermined probability value. The block size estimate is then calculated as the sum of the minimum block size for the RDD, and the product of the number of regions I, also referred to as the iterator I, and the region size. This will be described in more detail with reference to the example depicted in FIGS. 4 and 5.

The free allocated cache space estimation logic 126 provides logic for estimating the free space available in the allocated portion of the cache memory for the application based on the application's allocated space, the amount of that allocated space already used by cached blocks of data, and the estimate of the amount of storage that will be utilized by the RDD's block in storing records to the cache storage. That is, the RDD block size estimation logic 124 generates a block size estimate based on the number of regions I. This block size estimate is used along with the estimated free space determined from the allocated space, cached space already used, and the estimate of the cached space that is being cached by the application, to determine an estimated amount of resulting free space F that will be present should the block of data for the RDD be stored to the cache memory.

The cache policy engine 128 provides logic for determining whether or not a block of data for the RDD should be stored to the cache memory based on the estimate of resulting free space F generated by the free allocated cache space estimation logic 126. For example, if the estimate of the resulting free space F is equal to or greater than a predetermined threshold amount, then the block of data for the RDD may be stored to the cache memory. If the estimate of the resulting free space F is less than the predetermined threshold amount, then the block of data may not be cached in the cache memory. In one example embodiment, this predetermined threshold amount is 0 such that if the estimated resulting free space F is greater than 0 then the block of data may be cached, but if it is equal to or less than 0 then the block of data will not be cached. Of course other cache policies may be implemented without departing from the spirit and scope of the present invention.

Figure 4:
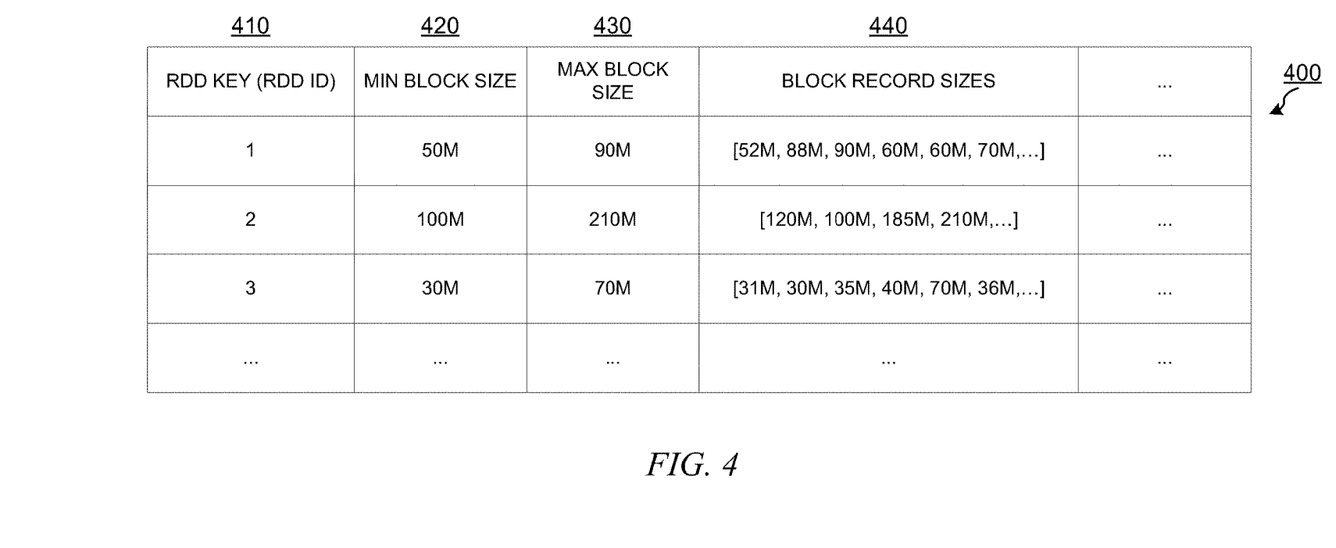
FIG. 4 is an example diagram illustrating an example RDD size map in accordance with one illustrative embodiment.
Figure 5:
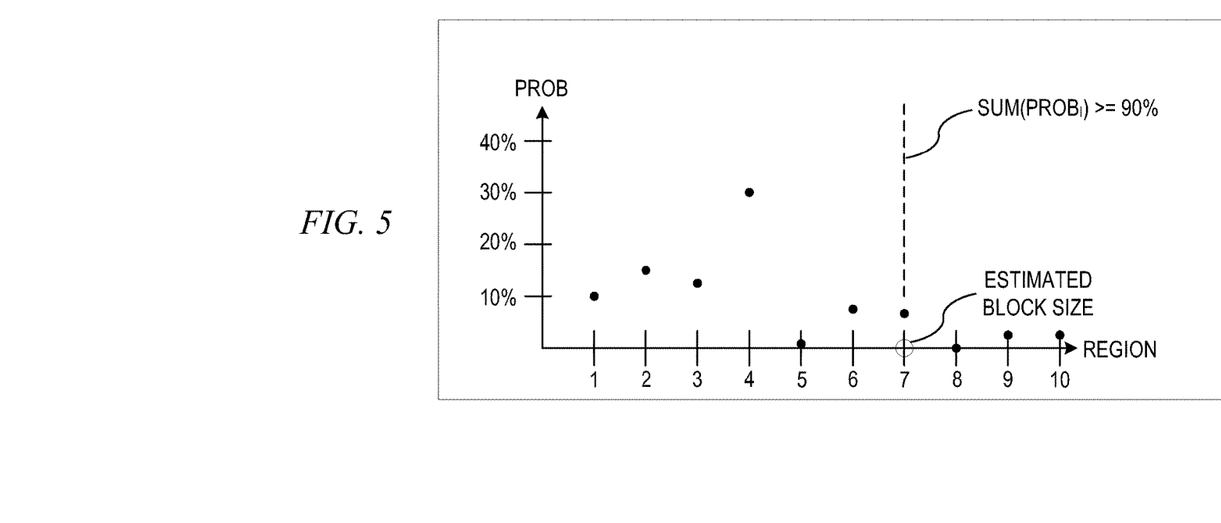
FIG. 5 is an example diagram illustrating a probability distribution generated in accordance with one illustrative embodiment.

To further illustrate the operation of each of the elements 122-128, consider the example shown in FIGS. 4-5. FIG. 4 is an example diagram illustrating an example RDD size map in accordance with one illustrative embodiment. FIG. 4 provides a basis for further outlining the process for generating a probability distribution based on a RDD size map in accordance with one illustrative embodiment. The resulting probability distribution for the example shown in FIG. 4 is illustrated in FIG. 5 which will provide a basis for outlining the process of estimating the possible maximum size of the RDD block. The RDD size map in FIG. 4 is one example of a RDD size map data structure 123 in FIG. 1 which may be operated on by the probability distribution generator 122 to generate probability values for a plurality of regions of a probability distribution such as shown in FIG. 5, for example.

As shown in FIG. 4, the RDD size map data structure (RDDSizeMap) 400 comprises one or more entries where each entry is associated with a RDD of the application. Each entry includes a field 410 for the RDD identifier, or RDD Key, that is an index identifying the particular RDD of the application to which the entry corresponds. The RDD Key or RDD ID is related to the specified cached RDD ID information when a RDD block is cached in the cache memory. Each entry further includes fields 420-440 for storing the minimum block size, maximum block size, and block record sizes for the RDD, respectively. The RDD minimum block size is the size of the smallest record of the RDD block. The RDD maximum block size is the size of the largest record of the RDD block. The RDD size map data structure 400 is updated to include new entries as additional RDD blocks are cached in the cache memory, e.g., by operation 940 in FIG. 9 described hereafter.

With the mechanisms of the illustrative embodiments, assuming a populated RDDSizeMap data structure 400 such as shown in FIG. 4, a RDD that is to be processed is identified in the RDDSizeMap data structure 400, such as by incrementing to the next RDD Key or RDD ID value and the corresponding entry in the RDDSizeMap data structure 400. The corresponding entry for the RDD is retrieved from the RDDSizeMap data structure 400. The probability distribution is then generated by the probability distribution generator 122, which is configured with the region number to use to indicate the total number of regions in which to split up the probability distribution of the block record sizes. That is, the probability distribution generator 122 determines each region size for the RDD based on the differences for the minimum and maximum block sizes, divided by the total number of regions.

For purposes of illustration, RDD Key=1 in FIG. 4, and its corresponding min, max, and records values will be utilized as an example. With this example in mind, the regionSize, using the above relationship 1 generates a region value of 4 M, i.e. (90−50)/10=4. Then, for each region, the probability distribution generator 122 generates a probability value as the ratio of the number of block records having a block record size that falls within the range of the region, as determined based on the regionSizes and relationship 2 above, divided by the total number of block records.

FIG. 5 is one example of a probability distribution having 10 regions in accordance with the example of RDD Key=1 above. Based on the probability distribution of FIG. 5, and the corresponding probabilities for each of the regions, the RDD block size estimation logic 124, estimates the RDD block size, and thus, the maximum size of the Scala iterator (where an iterator in Scala, which is the language upon which Apache Spark was developed, is a mechanism for accessing a collection of data). As noted above, with relationship 3, the RDD block size is estimated by first determining the value of the number of regions I where a predetermined probability threshold value is met or exceeded, e.g., 90% in the running example. Thus, for example, if one sums the probabilities of regions 1 through 7 in the example depicted in FIG. 5, I=7 is the place in the probability distribution where the sum of the regions i to I meets or exceeds 90%.

Having determined the value of I where the predetermined probability threshold value is met or exceeded, the RDD block size estimate may be calculated as the sum of the minimum block size for the RDD and the product of I and the region size, i.e. BlockEstimateSize=MinBlockSize+ I*regionSize. For RDD=1 in FIG. 4, the BlockEstimateSize=50+7*4=78 M. This is an estimate of the block size for the RDD since it is not known to the cache policy engine 128 what the size of a block is prior to the block being cached in known mechanisms.

That is, it should be appreciated that this process may be performed with regard to each of the RDDs for the application to determine estimates of the RDD block sizes that each of the threads of the application are writing to the cache memory or will write to the cache memory. This gives an estimate of the size of the RDD block sizes that can be used to make determinations as to whether to allow caching of the RDD block prior to the caching occurring, and thereby avoiding the threads exceeding the allocated cache memory space for the application. Such is not possible in known distributed dataset based processing, such as in Apache Spark, since the size of the blocks are not known until after they are cached.

Having determined the estimate of the block size for the RDD, the free allocated cache space estimation logic 126 estimates the free space that is available in the cache memory while the threads are caching blocks of the RDD to the allocated space for the application in the cache memory. This estimate of free space may be used by the cache policy engine 128 when applying a cache policy to determine whether or not to allow caching of a block of data to the multi-tenant cache memory, e.g., a SSD based cache for the distributed dataset based applications.

The free space estimate for the cache memory may be determined by first identifying the amount of cache space allocated to the application (AllocatedSpace). A vector of cached blocks in the cache memory, or SSD, is generated and/or maintained (referred to as the BlockCachedVector). The BlockCachedVector stores the sizes of the blocks of data of the application already cached in the cache memory. From this vector, the free allocated cache space estimation logic 126 may determine the amount of cached space used as the sum of the blocks identified in the BlockCachedVector, which is referred to as the CachedSpace.

In addition to the BlockCachedVector, since multiple threads are caching blocks to the cache memory, or SSD, concurrently, an additional vector (referred to as the BlockCachingVector) is generated and/or maintained that stores the current estimates of the block sizes for the various RDDs of the application (where these estimates may be calculated using the mechanisms described above operating on each of the RDDs in the RDDSizeMap. Similar to the BlockCachedVector, by summing the estimates of the block size estimates, an estimated amount of cache space that corresponds to currently caching blocks of data may be generated, which is referred to as the EstimateCachingSpace.

From these values, an estimate of the free space in the allocated cache space for the application may be calculated by the free allocated cache space estimation logic 126 as the AllocatedSpace less the CachedSpace and the EstimateCaching Space, i.e. EstimateFreeSpace=AllocatedSpace–CachedSpace–EstimateCachingSpace. A flag value F may then be calculated for each RDD by the free allocated cache space estimation logic 126 that indicates a point at which caching of a block of data for that RDD may be blocked or inhibited. The flag value F is a function of the EstimateFreeSpace with a buffer value determined based on an implementation specific size threshold and the BlockEstimateSize for the RDD, e.g., F=EstimateFreeSpace–BlockEstimateSize*Size_Threshold, where Size_Threshold is a threshold value that is implementation specific and provides a buffer between the estimated free space in the allocated application cache memory space and the estimated block size for the RDD. In some illustrative embodiments, the Size_Threshold is set to 1.5, but can be set to any suitable value dependent upon the particular desired implementation.

Having determined a flag value for the RDD, the caching policy engine 128 applies the F value to the block of data sought to be cached for the RDD by the thread of the application. If F is greater than a predetermined value, e.g., 0 in some illustrative embodiments, then the cache policy engine 128 allows the block of data for the RDD to be cached to the application's allocated cache memory space and corresponding data structures are updated to reflect the fact that this block has now been cached, recording the actual block size of the block that is cached, e.g., in the BlockCachedVector and the RDDSizeMap. If F is not greater than the predetermined value, then the caching of the block of data may be blocked or inhibited by the cache policy engine 128 and the block of data is not stored to the applications allocated cache memory space as it would exceed the application's allocated space or has a high likelihood of exceeding the applications' allocated space. This process may be repeated for each block of data that is being cached for the RDD and may be repeated for each RDD. Moreover, this process may be performed with regard to multiple applications and their corresponding threads, RDDs, and the like.

Thus, the illustrative embodiments provide mechanisms for improving the operation of cache memories and data storage in such cache memories utilized for distributed datasets operated on by distributed data processing applications, such as Apache Spark and the like, by providing simulation and prediction logic to simulate and predict block sizes and free space in cache memories for RDDs. Based on the simulation and prediction, the mechanisms of the illustrative embodiments control caching of blocks of data in a multi-tenant shared cache memory in which blocks of data are being cached concurrently by a plurality of threads. The illustrative embodiments provide a solution to the problem of caching partition data (or blocks) of logical partitions of a dataset, such as RDDs, where there are multiple concurrently executing threads that are caching the partition data and each thread is not aware of the records and the sizes of such records that are being written by the other threads to the cache memory allocated for the application. Through the operation of the illustrative embodiments, controlling of the caching of blocks of data is made possible so as to avoid exceeding an application's allocated memory space in the cache memory even when multiple threads are concurrently caching blocks of data to the cache memory.

Figure 6:
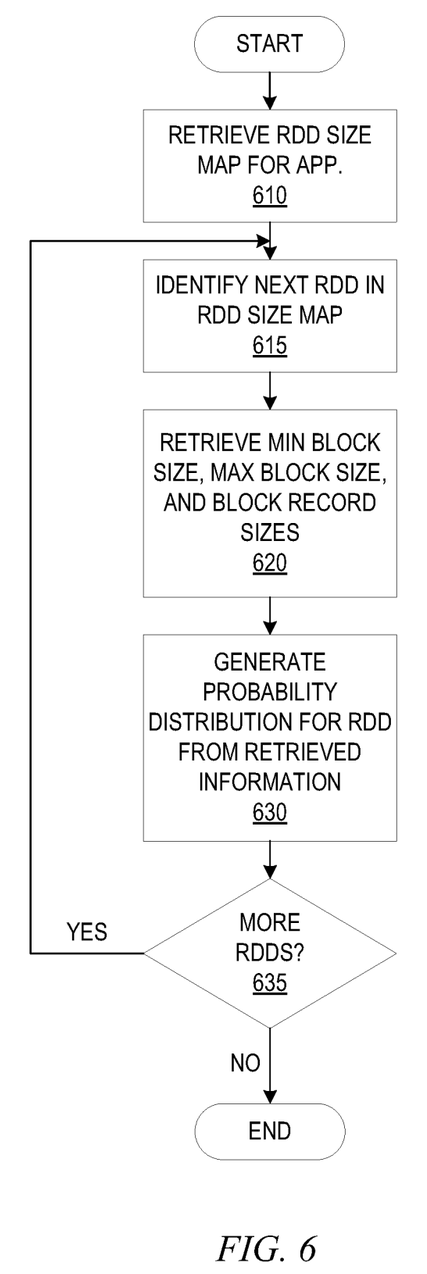
FIG. 6 is a flowchart outlining an operation for generating a probability distribution in accordance with one illustrative embodiment.

FIG. 6 is a flowchart outlining an operation for generating a probability distribution in accordance with one illustrative embodiment. The operation outlined in FIG. 6 may be implemented, for example by the probability distribution generator 122 of the multi-tenant cache management engine 120 in FIG. 1.

As shown in FIG. 6, the operation starts by retrieving the RDDSizeMap for the application (step 610). The RDDSizeMap may have the format as shown in FIG. 4 above or other format that provides information regarding the RDD's minimum, maximum, and block record sizes. It should be appreciated that various formats may be utilized with FIG. 4 being only one example. Moreover, other information may be included in the RDDSizeMap without departing from the spirit and scope of the present invention.

For the next RDD in the RDDSizeMap (615), e.g., the loop starts at RDD Key or RDD ID 1 and progresses to the last RDD for the application, the minimum block size (MinBlockSize), maximum block size (MaxBlockSize), and block record sizes (BlockRecords) for the particular RDD Key or RDD ID are retrieved from the corresponding entry in the RDDSizeMap (step 620). Based on these values retrieved from the RDDSizeMap, a probability distribution is generated by determining the probability of each region based on a specified predetermined number of regions and calculating the ratio of block record sizes falling into each of the regions relative to the total number of block records (step 630). That is, in step 630, the relationships 1-3 discussed above are applied to generate the probability distribution based on splitting the range of probabilities into a predetermined number of regions, i.e. regionNumber, having a corresponding region size (regionSize) determined based on the difference between the maximum and minimum block sizes for the RDD. The resulting probability distribution split into block record regions is then output for use in estimating a maximum size for the RDD block. The operation determines if there are more RDDs to process from the RDD size map (step 635) and if so, returns to step 615.

Figure 7:
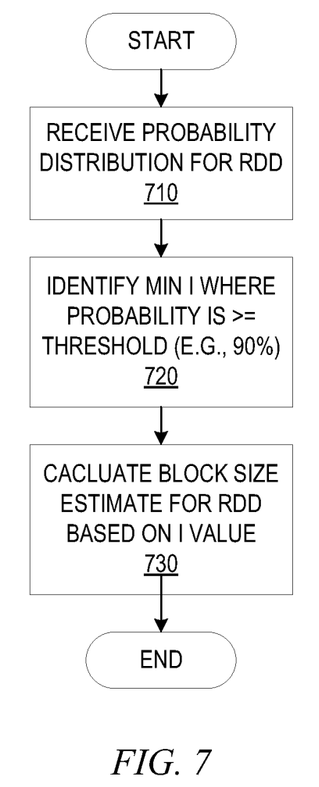
FIG. 7 is a flowchart outlining an operation for estimating a maximum size for a RDD block that is to be cached in accordance with one illustrative embodiment.

FIG. 7 is a flowchart outlining an operation for estimating a maximum size for a RDD block that is to be cached in accordance with one illustrative embodiment. The operation outlined in FIG. 7 may be implemented, for example by the RDD block size estimation logic 124 of the multi-tenant cache management engine 120 in FIG. 1.

As shown in FIG. 7, the operation starts by receiving a probability distribution for the RDD, such as may be generated by the process outlined in FIG. 6 and described above (step 710). A determination is made as to the minimum region index I at which a predetermined threshold probability value is met or exceeded based on this probability distribution (step 720). As discussed above, this may involve summing region probability values, from region 1 to region I, until the predetermined threshold probability value is met or exceeded at which point I is set to the corresponding value, e.g., 7 in the example depicted in FIG. 5. Thereafter, an estimate for the block size for the RDD is calculated based on the value of I, e.g., BlockEstimateSize=MinBlockSize+I*regionSize in the above described example illustrative embodiments (step 730). While this equation for calculating the block size estimate is used in the examples of the illustrative embodiments, it should be appreciated that this is only one example and many modifications to this equation, and even other equations, for calculating the block size estimate may be used without departing from the spirit and scope of the present invention. The resulting block size estimate (Block- EstimateSize) is used to estimate the amount of remaining free space in an application's allocated portion of cache memory.

Figure 8:
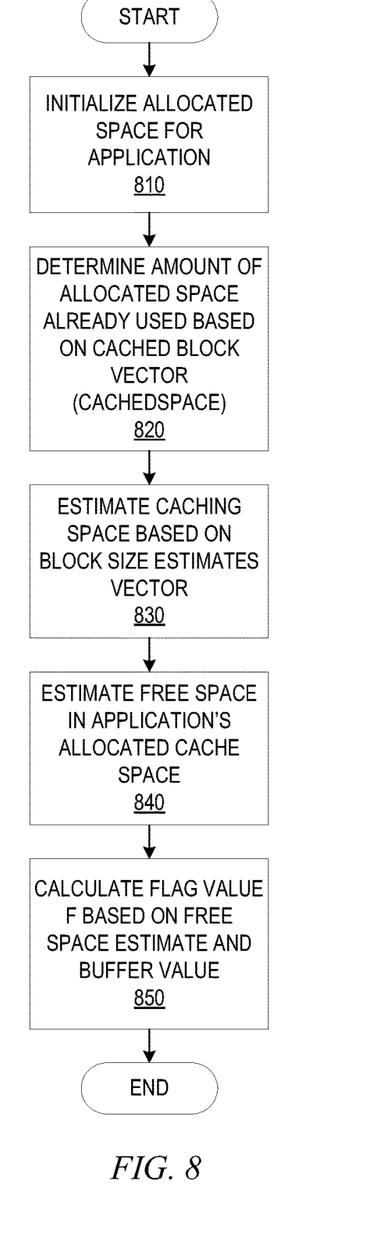
FIG. 8 is a flowchart outlining an operation for estimating the amount of remaining free space in an application's allocated portion of a cache storage device in accordance with one illustrative embodiment.

FIG. 8 is a flowchart outlining an operation for estimating the amount of remaining free space in an application's allocated portion of a cache memory in accordance with one illustrative embodiment. The operation outlined in FIG. 8 may be implemented, for example by the free allocated cache space estimation logic 126 of the multi-tenant cache management engine 120 in FIG. 1.

As shown in FIG. 8, the operation starts by initializing or retrieving an indication of the amount of cache space, such as in an SSD or other cache memory, that has been allocated to the application (step 810). The amount of the allocated space that has already been used by the caching of blocks of data to the allocated cache space is determined based on a vector (e.g., the BlockCachedVector(i)) that stores the block sizes that have been cached by the application, e.g., the amount used is CacheSpace and is determined as the sum of the blocks of data already cached, i.e. the sum of the blocks indicated in the vector BlockCachedVector(i) (step 820).

A vector (e.g. BlockCachingVector) of the estimates of the block sizes (generated for each RDD using the operation outlined in FIG. 7 above and described previously) of the RDDs being concurrently cached to the application's allocated cache memory space is used to estimate the caching space (step 830). For example, similar to step 820 above, the sum of the blocks whose sizes are estimated in the BlockCachingVector may be used to generate an estimate of the amount of the applications' allocated cache space will be used by the blocks of data being concurrently cached by the various threads of the application.

An estimate of the free space in the application's allocated cache memory space is generated based on the amount of allocated space, as determined in step 810, the cache space already used, as determined in step 820, and the estimated caching space, as determined in step 830 (step 840). For example, the estimated free space (EstimatedFreeSpace) may be determined as the application's allocated cache memory space (AllocatedSpace) less the amount of that space already used by cached blocks (CachedSpace) and the estimated cached space that will be used by the blocks being cached by the concurrently executing threads (EstimateCachingSpace).

Based on the estimate of the free space in the application's allocated cache memory space (EstimateFreeSpace) generated in step 840, a flag value F may be calculated based on a buffer determined based on the estimated block size for the particular RDD in being processed (step 850). For example, the flag value F may be calculated as the EstimateFreeSpace less a product of the block size estimated for the RDD (BlockEstimateSize) and a size threshold value (Size_Threshold). The resulting F value may be used by the cache policy engine to determine whether a block of data for an RDD should be allowed to be cached in the application's allocated cache memory space or not.

Figure 9:
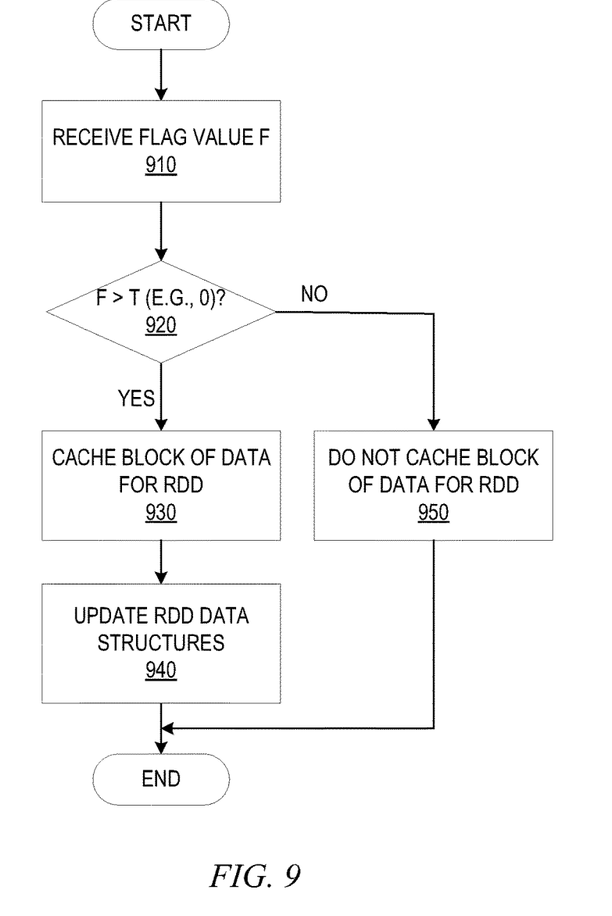
FIG. 9 is a flowchart outlining an operation for applying a cache policy based on a flag value generated based on the estimate of remaining free space in accordance with one illustrative embodiment.

FIG. 9 is a flowchart outlining an operation for applying a cache policy based on a flag value generated based on the estimate of remaining free space in accordance with one illustrative embodiment. The operation outlined in FIG. 9 may be implemented, for example by the cache policy engine 128 of the multi-tenant cache management engine 120 in FIG. 1.

As shown in FIG. 9, the operation starts by receiving the F value for the particular RDD being processed, such as may be calculated using the operation outlined in FIG. 8 above (step 910). A determination is made as to whether the F value is greater than a threshold value T, which in the depicted example is 0, i.e. a determine of whether the flag value indicates that there is no more available free space in the application's allocated cache memory space (taking into consideration the buffer provided by the combination of the Size_Threshold and BlockEstimateSize for the RDD) (step 920). If the F value is greater than the threshold value T, then the block of data is cached in the applications' allocated cache memory space (step 930) and the appropriate data structures, such as the RDDSizeMap and CachedSpace data structures, for example, are updated to reflect the caching of the block of data (step 940). If the F value is not greater than the threshold value T, then the block of data is not permitted to be cached (step 950). In such a case, the distributed dataset based processing system would implement its functionality when needing to process the block of data when that block of data is not in the cache, e.g., loading the block of data from its corresponding data source and recomputing the block of data using RDD lineage, for example. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a plurality of processing nodes and a multi-tenant cache storage device for caching blocks of data of one or more Resilient Distributed Datasets (RDDs) associated with an application, the method comprising:
   retrieving, by a multi-tenant cache management engine of the data processing system, RDD block size information for an RDD associated with the application;
   generating, by the multi-tenant cache management engine, a probability distribution of RDD block sizes based on the RDD block size information;
   estimating, by the multi-tenant cache management engine, a maximum size for a RDD block of data based on the probability distribution;
   estimating, by the multi-tenant cache management engine, an amount of free space in a portion of the multi-tenant cache memory allocated to the application based on the estimated maximum size for the RDD block of data; and
   managing, by the multi-tenant cache management engine, cache operations for caching data associated with the application to the multi-tenant cache storage device based on the estimated amount of free space in the portion of the multi-tenant cache storage device allocated to the application at least by:
   calculating a flag value as a function of the estimated amount of free space; and
   controlling whether or not a block of data is stored in the multi-tenant cache storage device based on a relationship of the flag value to a threshold value.

2. The method of claim 1, wherein the RDD block size information comprises a minimum block size for the RDD, a maximum block size for the RDD, and one or more block record sizes for records of blocks associated with the RDD.

3. The method of claim 2, wherein generating the probability distribution comprises:
   determining a total number of regions into which to divide the probability distribution;
   determining, based on the minimum block size for the RDD, maximum block size for the RDD, and the total number of regions, a region size for each region in the probability distribution;
   calculating, based on the region size and the minimum block size for the RDD, a range of block sizes for each region in a plurality of regions of the probability distribution; and
   calculating, based on the block record sizes for the RDD and the ranges associated with each of the plurality of regions, a probability value associated with each region of the probability distribution.

4. The method of claim 2, wherein estimating a maximum size for a RDD block of data based on the probability distribution comprises:
   determining, by the multi-tenant cache management engine, a number of regions whose associated probability values, when accumulated, satisfy a predetermined criterion; and
   calculating the estimated maximum size for the RDD block based on the number of regions.

5. The method of claim 4, wherein calculating the estimated maximum size for the RDD block based on the number of regions comprises calculating the estimated maximum size as a function of the minimum block size for the RDD, the number of regions, and the region size.

6. The method of claim 1, wherein estimating the amount of free space in a portion of the multi-tenant cache storage device allocated to the application based on the estimated maximum size for the RDD block of data comprises:
   retrieving a first vector comprising values indicating block sizes of blocks associated with RDDs associated with the application that have already been cached to the multi-tenant cache storage device;
   retrieving a second vector comprising values indicating estimates of maximum block sizes concurrently being cached by threads of the application for RDDs associated with the application; and
   estimating the amount of free space based on the first vector and the second vector.

7. The method of claim 6, wherein estimating the amount of free space based on the first vector and the second vector comprises:
   calculating a first total amount of storage space in the multi-tenant cache storage device used by blocks of data associated with the application;
   calculating an estimated second total amount of storage space in the multi-tenant cache storage device that will be used by blocks of data concurrently being cached by threads of the application; and
   subtracting the first total amount and second total amount from an allocated amount of storage space allocated to the application in the multi-tenant cache storage device.

8. The method of claim 1, wherein calculating the flag value comprises calculating the flag value as a function of the estimated amount of free space, the estimate of the block size associated with the RDD, and a size threshold value.

9. The method of claim 1, wherein the multi-tenant cache storage device is a solid state drive memory of a distributed dataset based application in which multiple nodes of the data processing system process portions of the distributed dataset and cache data to the multi-tenant cache storage device using RDDs.

10. A computer program product comprising a computer readable storage medium having a computer readable program stored therein, wherein the computer readable program, when executed on a computing device, causes the computing device to:
   retrieve a Resilient Distributed Dataset (RDD) block size information for an RDD associated with an application;
   generate a probability distribution of RDD block sizes based on the RDD block size information;
   estimate a maximum size for a RDD block of data based on the probability distribution;
   estimate an amount of free space in a portion of the multi-tenant cache storage device allocated to the application based on the estimated maximum size for the RDD block of data; and manage cache operations for caching data associated with the application to a multi-tenant cache storage device based on the estimated amount of free space in the portion of the multi-tenant cache storage device allocated to the application at least by:
  calculating a flag value as a function of the estimated amount of free space; and
  controlling whether or not a block of data is stored in the multi-tenant cache storage device based on a relationship of the flag value to a threshold value.

11. The computer program product of claim 10, wherein the RDD block size information comprises a minimum block size for the RDD, a maximum block size for the RDD, and one or more block record sizes for records of blocks associated with the RDD.

12. The computer program product of claim 11, wherein the computer readable program further causes the computing device to generate the probability distribution at least by:
  determining a total number of regions into which to divide the probability distribution;
  determining, based on the minimum block size for the RDD, maximum block size for the RDD, and the total number of regions, a region size for each region in the probability distribution;
  calculating, based on the region size and the minimum block size for the RDD, a range of block sizes for each region in a plurality of regions of the probability distribution; and
  calculating, based on the block record sizes for the RDD and the ranges associated with each of the plurality of regions, a probability value associated with each region of the probability distribution.

13. The computer program product of claim 12, wherein the computer readable program further causes the computing device to estimate a maximum size for a RDD block of data based on the probability distribution at least by:
  determining, by the multi-tenant cache management engine, a number of regions whose associated probability values, when accumulated, satisfy a predetermined criterion; and
  calculating the estimated maximum size for the RDD block based on the number of regions.

14. The computer program product of claim 13, wherein the computer readable program further causes the computing device to calculate the estimated maximum size for the RDD block based on the number of regions at least by calculating the estimated maximum size as a function of the minimum block size for the RDD, the number of regions, and the region size.

15. The computer program product of claim 10, wherein the computer readable program further causes the computing device to estimate the amount of free space in a portion of the multi-tenant cache storage device allocated to the application based on the estimated maximum size for the RDD block of data at least by:
  retrieving a first vector comprising values indicating block sizes of blocks associated with RDDs associated with the application that have already been cached to the multi-tenant cache storage device;
  retrieving a second vector comprising values indicating estimates of maximum block sizes concurrently being cached by threads of the application for RDDs associated with the application; and
  estimating the amount of free space based on the first vector and the second vector.

16. The computer program product of claim 15, wherein the computer readable program further causes the computing device to estimate the amount of free space based on the first vector and the second vector at least by:
  calculating a first total amount of storage space in the multi-tenant cache storage device used by blocks of data associated with the application;
  calculating an estimated second total amount of storage space in the multi-tenant cache storage device that will be used by blocks of data concurrently being cached by threads of the application; and
  subtracting the first total amount and second total amount from an allocated amount of storage space allocated to the application in the multi-tenant cache storage device.

17. The computer program product of claim 10, wherein the computer readable program further causes the computing device to calculate the flag value at least by calculating the flag value as a function of the estimated amount of free space, the estimate of the block size associated with the RDD, and a size threshold value.

18. An apparatus comprising:
  a plurality of processing nodes; and
  a multi-tenant cache storage device; and
  a multi-tenant cache storage device management engine configured to:
  retrieve a Resilient Distributed Dataset (RDD) block size information for an RDD associated with an application;
  generate a probability distribution of RDD block sizes based on the RDD block size information;
  estimate a maximum size for a RDD block of data based on the probability distribution;
  estimate an amount of free space in a portion of the multi-tenant cache storage device allocated to the application based on the estimated maximum size for the RDD block of data; and
  manage cache operations for caching data associated with the application to the multi-tenant cache storage device based on the estimated amount of free space in the portion of the multi-tenant cache storage device allocated to the application at least by:
  calculating a flag value as a function of the estimated amount of free space; and
  controlling whether or not a block of data is stored in the multi-tenant cache storage device based on a relationship of the flag value to a threshold value.

* * * * *